United States Patent [19]
Nauflett et al.

[11] 3,882,784
[45] May 13, 1975

[54] NITROESTER PROPELLANT, CASING, AND LINER OF AN EPOXY-POLYAMIDE COPOLYMER CONTAINING A STABILIZER

[75] Inventors: George W. Nauflett, Oxon Hill; Craig E. Johnson, Indian Head, both of Md.

[73] Assignee: The United States of America as represented by the Secretary of the Navy, Washington, D.C.

[22] Filed: July 3, 1972

[21] Appl. No.: 270,794

[52] U.S. Cl. .................... 102/103; 149/2; 149/19.6
[51] Int. Cl. .......................... F42b 1/00; C06d 5/06
[58] Field of Search .......... 102/103; 149/19, 2, 19.6

[56] References Cited
UNITED STATES PATENTS

| | | | |
|---|---|---|---|
| 3,046,829 | 7/1962 | Roemer | 102/103 X |
| 3,171,764 | 3/1965 | Parker et al. | 147/19 |
| 3,236,704 | 2/1966 | Axelrod et al. | 149/19 |
| 3,636,881 | 1/1972 | Godfrey | 102/103 |
| 3,644,222 | 2/1972 | Fleming | 102/103 X |

OTHER PUBLICATIONS

Skeist, Handbook of Adhesives, pp. 323–330, 425 & 430–433, Reinhold Publishing Corporation (1962) New York.

*Primary Examiner*—Benjamin R. Padgett
*Assistant Examiner*—E. A. Miller

[57] ABSTRACT

A lined propellant device comprising a propellant chamber lined with an epoxy-amide reaction product. The liner also includes a compound which acts as a stabilizer between this reaction product and the propellant ingredients.

6 Claims, No Drawings

NITROESTER PROPELLANT, CASING, AND LINER OF AN EPOXY-POLYAMIDE COPOLYMER CONTAINING A STABILIZER

BACKGROUND OF THE INVENTION

A rocket motor commonly comprises a combustion chamber having an exhaust nozzle and a propellant grain contained within the chamber. The exhaust nozzle head is usually made separate from the rest of the motor chamber and is adapted to be attached to the remaining chamber. This head also usually incorporates a means for firing the propellant grain. Upon burning, the grain produces a large volume of gas under high pressure which is exhausted from the chamber through the nozzle at high velocity. The reaction resulting from the acceleration of the gas through the nozzle creates the propulsive thrust. For satisfactory operation, it is required that the burning rate of the propellant grain remains constant throughout the operation, since fluctuations in the burning rate will at least cause erratic control of the rocket and, if pressure changes are severe enough, can rupture the rocket.

To overcome this problem, it is well known in the propulsion art, be it rocket or otherwise, that it is necessary to provide an adhesive surface between the solid propellant grain and the outer case which contains it. This layer of material is normally referred to as a liner since it often insulates as well as bonds. The overall performance and reproducibility of the desired characteristics of a solid propellant grain are highly dependent upon the adequacy of the liner in achieving a bonding of the grain to the case. Moreover, in the manufacture of many rocket motors, it is absolutely required that the propellant be bonded to the inner wall of the motor chamber during handling and firing; otherwise, burning takes place along the grain on the surface adjacent to fissure to thereby disturb the burning equilibria and greatly impair the ballistics. In addition, a strong case bond lends great support to the propellant during handling and firing. The bond that the liner forms between the propellant and chamber walls prevents movement of the propellant grain, which would create air voids and spaces.

SUMMARY OF THE INVENTION

It is therefore an object of this invention to obtain a propellant wherein the burning rate remains constant. It is another object of the instant invention to provide a propulsion means for a rocket wherein suitable control of the rocket is achieved.

It is another object of the instant invention to provide an insulating material for a propellant chamber.

It is still an additional object of the invention to provide a propulsion means with a uniform and predictable burning equilibria and ballistic performance.

It is yet another object of the instant invention to provide a means for greater support to the propellant during handling and firing.

It is an additional object of the present invention to provide a stable propellant system.

It is still another object of the instant invention to prevent the formation of voids and spaces in the propellant during use.

These and other objects are accomplished by providing a liner for the propellant chamber walls, hereinafter alternatively referred to as the casing, wherein the liner is an epoxy-amide resin. An additional aspect of the invention involves the utilization of certain stabilizers in the liner. Other objects, advantages and novel features of the invention will become apparent from the following detailed description of the invention.

DETAILED DESCRIPTION OF THE INVENTION

The invention lies in the use of a specific type of polymer to coat the cavity of the chamber which houses the propellant. The coating material is of the thermosetting type and is prepared by mixing two components together. Component one comprises an amide resin which contains free amino groups, while component two comprises an epoxy resin that will react with these free amino groups to form a cured product.

The amide component comprises an amide polymer in a suitable solvent, such as mixtures of alcohols and hydrocarbons, such as an isopropyl alcohol-toluene mixture; hydrocarbons, alone, such as toluene, xylene, etc.; and alcohols alone, such as isopropyl alcohol, etc. The amide polymer itself may be prepared as the polyamide of polymerized vegetable oil. The polyamides are different than the common Nylon type polyamides. Instead of being condensations of adipic acid and hexamethylene diamine, they are condensation products of dimerized (and trimerized) vegetable oil, unsaturated fatty acids, and aryl or alkyl polyamines. The structure of these polymers is complex, but may be approximated by the following equations:

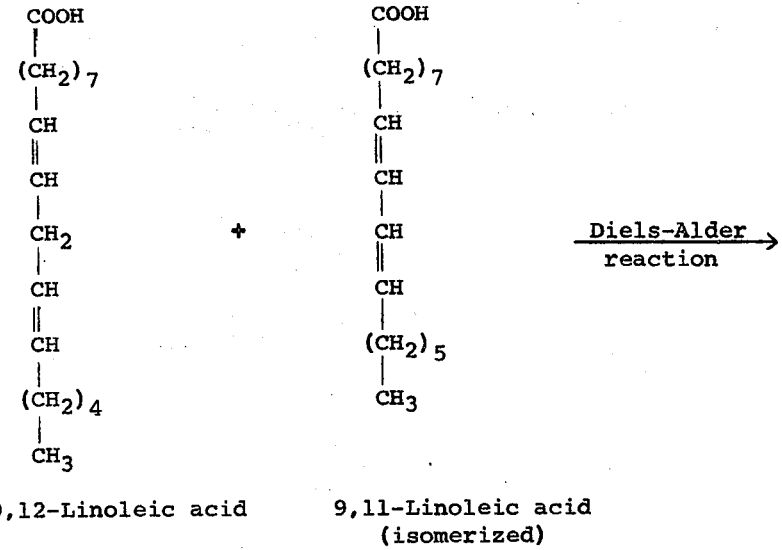

—Continued

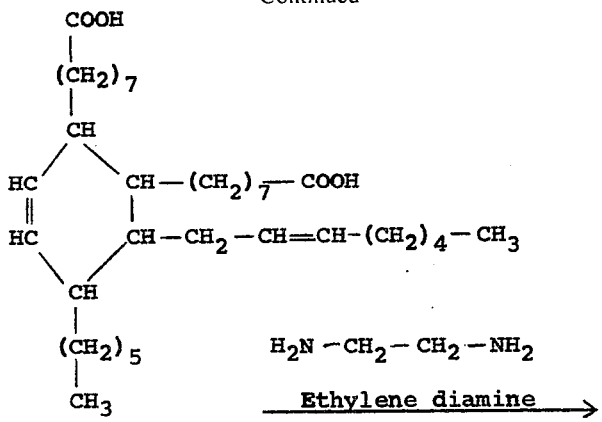

Linoleic acid dimer

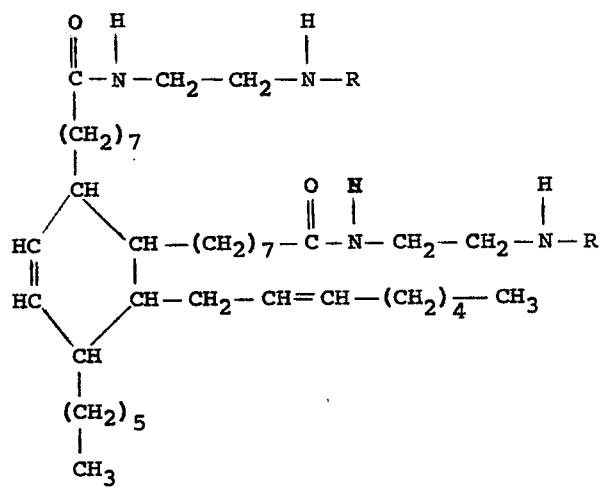

where R may be hydrogen or another linoleic acid dimer group. When amines having higher functionality than ethylene diamine are used, the resinous product will have active amine hydrogens (rather than amide hydrogens) capable of reacting with epoxy resins just as do ordinary polyamines.

Any polyamide which contains free amino groups, reactive with epoxide resins, can be used providing it meets the following requirements:

|  | Allowable Range | Preferred Range |
|---|---|---|
| Amine Value (milligrams equivalent of KOH per gram of resin)(ASTM D 2073 – 66) | 210–260 | 230–250 |
| Viscosity (Poisies 40° C.) | 450–1400 | 500–750 |
| Specific gravity | 0.90–0.99 | 0.95–0.99 |

Suitable polyamides are Versamid 115 [Registered trade mark of General Mills, Inc.], having an amine value of 210 – 230, and a viscosity of 800 – 1200. Versamide 115 is a liquid and it is noted that both liquid and solid polyamides can be used. The free amino groups remaining in the condensed resin provide adequate focal points for epoxy crosslinking and catalytic polymerization.

The second component comprises an epoxy resin in a suitable solvent such as a mixture of a Ketone and an aromatic hydrocarbon, like a methyl isobutyl Ketone-xylene mixture. Any conventional solvent for epoxy resins will suffice, however, so long as it can be used in the admixture as well. Any epoxy resin can be used provided that is meets the following specifications:

|  | General Range | Preferred Range |
|---|---|---|
| Melting Point | 55–165° C. | 60–85° C. |
| Viscosity (Gardner Holt) 40 % in butyl carbitol) | D to J | D to J |
| Epoxide Equivalent | 170–800 | 425–550 |
| Specific gravity | 1.1–1.3 | 1.16–1.21 |

The liquid and solid condensation products of the diglycidyl ether of bisphenol having an epoxy equivalent weight varying from 172 to 750 and a viscosity (centipoise at 25° C.) varying from 100 to 60,000, covers the type of epoxides commonly used. These are known as Epons and Epanols, and are available from Shell Chemical Company. Epon 1001, having an epoxy equivalent weight of 450 – 550, is especially useful. These Epons are conventionally prepared by reacting epichlorohydrin and bisphenol A, the reaction giving the diglycidyl ether of bisphenol A and higher molecular weight species. The structure of the resulting resin should be:

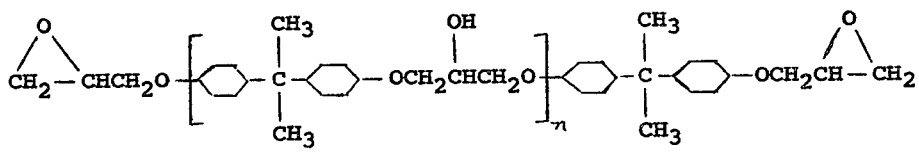

The higher molecular weight resins are produced in the presence of excess caustic.

It is the usual practice to prepare solutions of the resins separately to form concentrates, combine the concentrates and then apply the mixture, after mixing, to the casing. The mixture can be applied by any conventonal means, such as brushing, dipping, or spraying. If the latter method is used, the viscosity of the mixture is reduced with conventional thinners, such as an acrylic-nitrocellulose lacquer. The viscosity of the mixture prior to thinning will be from about 35 – 80 (Krebs-Stormer shearing rate 200 RPM).

The two components will react with each other upon contact and the cure will generally be complete within from about one night to about a week, at room temperature. The mixture is applied to the casing before curing is complete and is usually applied shortly after admixture. The ratio of epoxide resin to polyamide resin ranges from about 1.3:1 to about 2:1. The thickness of the resulting coating will be within the discretion of the user, but generally a thickness of from about 1 to about 100 mils can be utilized.

The mixtures will usually contain a pigment such as titanium dioxide, yellow iron oxide, red iron oxide, carbon black, chrome yellow, aluminum powder, chrome orange, lampblack, magnesium silicate (dry) and molybdate orange. The pigments preferred in the present invention are those producing a white or light green coating. Pigmentation is conducted in the customary manner using ball mills, roller mills, or other grinding devices to prepare fine pigment dispersions. Both the epoxy and amide resins provide excellent grinding mediums and serve well for grinding purposes. However, in the usual pigmentation process, the pigment is ground in the polyamide component since the polyamide solution is a better wetting agent than is the epoxy resin solution. Other additives, such as diatomaceous silica (flatting-Extender pigment), aluminum stearate, or silicon resin solution (anti-cratering agent) can be added to either component.

The following table lists examples of numerous mixtures that may be used in the instant invention. All of the following are designated as Brolite paint and can be purchased by the Andrews-Brown Company of Laurel, Md.

| COMPONENT I (Pigmented Compound) | White | Aircraft Gray | Seaplane Gray | Engine Gray | Black | Light Gull Gray |
|---|---|---|---|---|---|---|
| Titanium Dioxide | 30.8 | 27.0 | 12.4 | 12.7 | — | 8.7 |
| Yellow Iron Oxide | — | — | 1.8 | 2.2 | — | — |
| Red Iron Oxide | — | — | — | — | — | — |
| Carbon Black | — | 0.5 | 1.2 | 1.0 | 2.0 | Trace |
| Chrome Yellow | — | — | — | — | — | — |
| Tinting Pigments | — | Trace | Trace | Trace | Trace | — |
| Magnesium Silicate | — | — | 9.3 | — | 11.8 | 10.8 |
| Diatomaceous Silica | — | — | 3.2 | — | 6.0 | 5.5 |
| Aluminum Stearate | — | — | 0.3 | — | 0.2 | 0.2 |
| Methyl Isobutyl Ketone | 6.7 | 7.0 | — | 8.0 | — | — |
| Xylene | — | 3.7 | 10.6 | 2.8 | 11.8 | 14.1 |
| Silicone Resin Solution (60%) Anti-Cratering Agent | 0.3 | 0.3 | — | 0.4 | — | — |
| Epoxy Resin (75% in Toluene) | 26.6 | 24.2 | — | 31.8 | — | — |
| Polyamide (70% in xylene) | — | — | 14.1 | — | 15.0 | 12.4 |
| Butyl Alcohol | — | — | 3.0 | — | 4.7 | 3.0 |
| Isopropyl Alcohol | — | — | 2.5 | — | 3.0 | 2.8 |
| Molybdate Orange | — | — | — | — | — | — |
| Bon Maroon | — | — | — | — | — | — |
| COMPONENT II (Clear Compound) | | | | | | |
| Polyamide (70% in xylene) | 15.3 | 14.0 | — | 18.6 | — | — |
| Methyl Isobutyl Ketone | — | — | 15.4 | — | 18.0 | 16.5 |
| Xylene | 13.9 | 15.9 | 1.7 | 15.0 | 1.5 | 4.5 |
| Butyl Alcohol | 3.4 | 4.1 | — | 4.3 | — | — |
| Isopropyl Alcohol | 3.0 | 3.3 | — | 3.2 | — | — |
| Epoxy Resin (75% in Toluene) | — | — | 24.5 | — | 26.0 | 21.5 |

| COMPONENT I (Pigmented Compound) | Olive Drab Gloss | Olive Drab Lusterless | Clear | International Orange | Insignia Red |
|---|---|---|---|---|---|
| Titanium Dioxide | 0.9 | 3.3 | — | — | — |
| Yellow Iron Oxide | 5.8 | 6.0 | — | — | — |
| Red Iron Oxide | 1.6 | — | — | — | — |
| Carbon Black | 1.3 | 0.4 | — | — | — |
| Chrome Yellow | 3.0 | — | — | — | — |
| Tinting Pigments | Trace | Trace | — | Trace | Trace |
| Magnesium Silicate | — | 10.2 | — | — | — |
| Diatomaceous Silicia | — | 5.0 | — | — | — |
| Aluminum Stearate | — | 0.2 | — | — | — |
| Methyl Isobutyl Ketone | 9.0 | — | 7.1 | 7.6 | 10.8 |
| Xylene | 2.9 | 13.3 | — | 1.7 | 5.5 |
| Silicone Resin Solution (60%) Anti-Cratering Agent | 0.4 | — | 0.6 | 0.4 | 0.4 |
| Epoxy Resin (75% in Toluene) | 32.6 | — | 46.0 | 29.8 | 30.2 |
| Polyamide (70% in xylene) | — | 13.2 | — | — | — |
| Butyl Alcohol | — | 3.0 | — | — | — |
| Isopropyl Alcohol | — | 2.6 | — | — | — |
| Molybdate Orange | — | — | — | 22.8 | 4.3 |
| Bon Maroon | — | — | — | — | 4.3 |
| COMPONENT II (Clear Compound) | | | | | |
| Polyamide (70% in xylene) | 18.8 | — | 26.6 | 17.1 | 17.4 |
| Methyl Isobutyl Ketone | — | 15.9 | — | — | — |
| Xylene | 16.5 | 3.8 | 13.5 | 10.1 | 11.8 |
| Butyl Alcohol | 4.2 | — | 3.8 | 6.3 | 9.2 |
| Isopropyl Alcohol | 3.0 | — | 2.4 | 4.2 | 6.1 |
| Epoxy Resin (75% in Toluene) | — | 23.1 | — | — | — |

In all of the above examples, Epon 1001, having an epoxy equivalent of 450 – 550 and a structure approximated by:

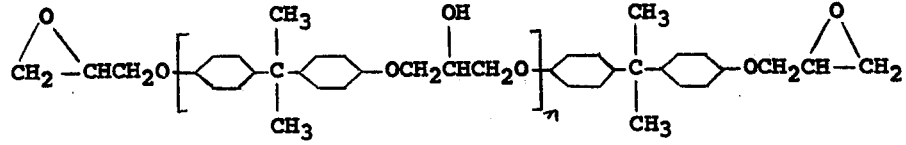

can be used as the epoxy resin while

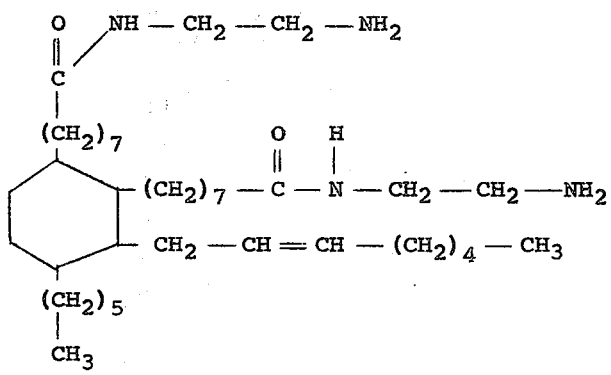

can be used as the amide resin.

The propellant grain with which this invention is applicable can be mono based, double based, or composite propellants. The mono base consists primarily of a single material which contains suffcent oxygen to sustain its own combustion, such as nitrocellulose. Diphenylamine is often present as a stabilizer, and other additives may be present depending on the application. Double base propellants have two principal ingredients — nitrocellulose and nitroglycerin. Various additives such as plasticizers, stabilizers, burning rate modifiers, extrusion lubricants, flash suppressors, etc., can be added. Additional oxidizers, such as ammonium perchlorate, can be added and give what is called a composite modified double base propellant. A composite propellant consists of either oxidizers and metallic fuels in a resinous binder or an oxidizer in a binder which also serves as a fuel. The oxidizer is often ammonium, lithium, sodium, or potassium nitrate or perchlorate, or any other conventional oxidizer. The fuel is typically aluminum, zirconium, magnesium, boron, or lithium, as well as the hydrides thereof. Typical binders are polyurethanes, polysulfides, polyvinyl chloride, or polyesters.

An additional aspect of the invention concerns the fact that, when the liner comes into contact with any propellant containing a nitroester, such as nitrocellulose, the basic nature of the liner lowers the stability of the propellant at the liner-propellant interface. It has been found, however, that any instability can be overcome by incorporating into the liner material any of the following compounds: amyl alcohol, 2-nitrodiphenylamine, napthalene, nitronapthalene and a mxiture of ethyl centralite and resorcinol in a ratio of from about 1:2 to 2:1, preferably 1:1. These compounds are effective stabilizers, not only when included within the epoxy-amide liner of the instant invention, but also for any other basic epoxy liner used in conjunction with a nitroester propellant. The amount of stabilizer added to the lining is from about 2 to about 10 percent, preferably 5 percent, based on the weight of the cured liner. One can use over 10 percent but the results do not significantly improve, and the addition of more than twenty percent detracts from the efficacy of the liner material itself. The stabilizer is usually added when the epxoy resin is mixed with amide resin, prior to coating. The following example, which is not intended to limit the scope of the invention or of the claims to follow, demonstrates the effect of the stabilizer.

EXAMPLE

A propellant chamber lined with White Brolite, an epoxyamide polymer of the type heretofore described, was filled with PBXW-103 Nitranol, a conventional nitrocellulose containing propellant. The ingredients of PBXW-103 Nitranol are as follows:

| INGREDIENT | PERCENT BY WEIGHT |
| --- | --- |
| ammonium perchlorate | 40.00 |
| aluminum | 27.00 |
| PNC (plastisol nitrocellulose) | 6.00 |
| metriol trinitrate | 23.00 |
| resorcinol | 0.20 |
| TEGDN (triethylene glycoldinitrate) | 2.50 |
| ethyl centralite | 1.30 |

The values of $T_1$, $+\Delta T$, and $T_i$, as determined by differential thermal analysis, were 130°C., 130°C., and 154°C., respectively. However, when five percent amyl alcohol was incorporated in the liner, the values of $T_1$, $+\Delta T$, and $T_i$ become 110°C., 120°C., and 151.6°C., respectively. A lower T value, especially $T_i$, indicates higher stability. $T_1$ represents temperature at which it begins to exotherm, known as the ONSET: $+\Delta T$ represents the peak of the decomposition curve; and $T_i$ represents the initial temperature at which it ignites. Similar results are achieved with the other stabilizers and with other liners, such as Duratyle, another amide-epoxy paint applicable in the instant invention.

As will be evident to those skilled in the art, various modifications can be made, or followed, in the light of the foregoing disclosure and discussion, without departing from the spirit or scope of the disclosure or from the scope of the claims.

What is claimed as new and desired to be secured by Letters Patent of the United States is:

1. A lined propellant device consisting essentially of:
   a solid nitroester propellant;
   a casing enclosing said solid nitroester propellant; and
   a liner which coats the inner surface of said casing and which is in contact with said propellant; wherein said liner comprises (1) the cured reaction product of an epoxy resin having an epoxide equivalent of 170 to 800, a melting point of 55° to 165°C, a Gardner Holt viscosity (40 percent epoxy resin in butyl carbitol) ranging from D to J and a specific gravity from about 1.1 to 1.3, with a polyamide which contains free amine groups and has an amine value of 210 –260, a viscosity at 40°C of 450 –1400 poise and a specific gravity of 0.90–0.99, and (2) about 2 to about 10 percent, based on the weight of said liner, of a stabilizer selected from the group consisting of amyl alcohol, 2 nitrodiphenylamine, naphthalene, nitronaphthalene and a mixture of ethyl centralite and resorcinol in a ratio of from about 1:2 to 2:1.

2. The lined propellant device of claim 1 wherein said epoxy equivalent ranges from about 425 to about 550; the epxoy resin melting point ranges from about 60° to 85°C; the epoxy resin specific gravity ranges from about 1.16 to about 1.21; said amine value ranges from about 230–250; the polyamide viscosity ranges from about 500–750 poise and the polyamide specific gravity ranges from about 0.95 to 0.99.

3. The propellant device of claim 2 wherein said epoxy resin has the structure:

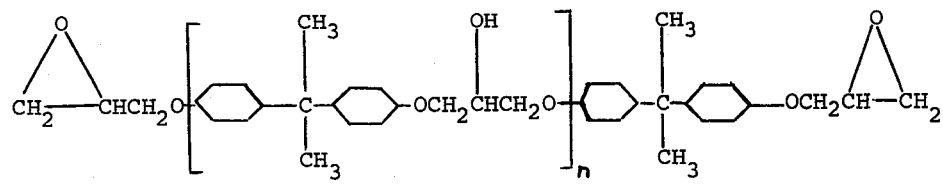

and the polyamide has the structure:

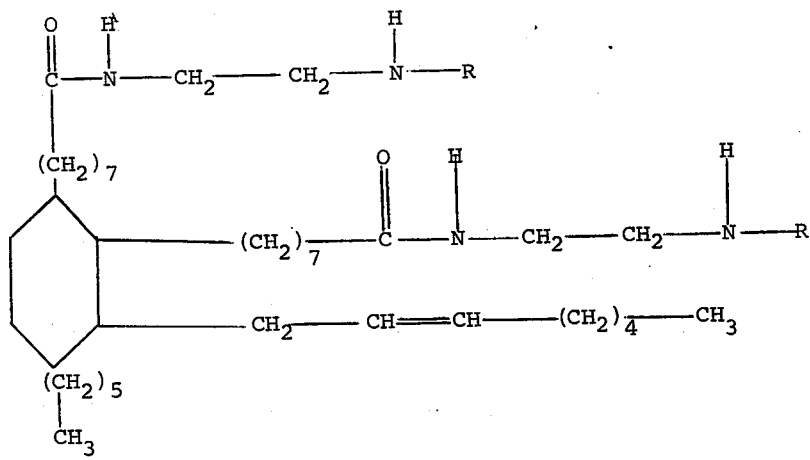

where R is hydrogen or a linoleic acid dimer group.

4. The lined propellant device of claim 1 wherein said stabilizer is amyl alcohol.

5. The lined propellant device of claim 2 wherein said stabilizer is amyl alcohol.

6. The lined propellant device of claim 3 wherein said stabilizer is amyl alcohol.

* * * * *